United States Patent
Choi et al.

(10) Patent No.: US 9,296,892 B2
(45) Date of Patent: *Mar. 29, 2016

(54) ALIPHATIC POLYCARBONATE/POLYESTER POLYMER RESIN COMPOSITION HAVING SUPERIOR LOW-TEMPERATURE RESISTANCE

(71) Applicants: SK INNOVATION CO., LTD., Seoul (KR); SK GLOBAL CHEMICAL CO., LTD., Seoul (KR)

(72) Inventors: Moonjung Choi, Seoul (KR); Minho Jeon, Daejeon (KR); Myungahn Ok, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 13/742,552

(22) Filed: Jan. 16, 2013

(65) Prior Publication Data

US 2013/0184398 A1    Jul. 18, 2013

(30) Foreign Application Priority Data

Jan. 17, 2012 (KR) .................. 10-2012-0005031

(51) Int. Cl.
   *C08L 69/00* (2006.01)
   *C08G 64/34* (2006.01)

(52) U.S. Cl.
   CPC ............... *C08L 69/00* (2013.01); *C08G 64/34* (2013.01)

(58) Field of Classification Search
   USPC ................ 524/539; 525/437; 528/403
   See application file for complete search history.

(56) References Cited

U.S. PATENT DOCUMENTS

| | | | | |
|---|---|---|---|---|
| 7,235,605 | B2 * | 6/2007 | Nakagawa et al. | 525/166 |
| 8,252,886 | B2 * | 8/2012 | Kim et al. | 528/196 |
| 8,747,970 | B2 * | 6/2014 | Kim et al. | 428/34.1 |
| 2003/0013840 | A1 | 1/2003 | Ree et al. | |
| 2012/0053282 | A1 * | 3/2012 | Shimizu et al. | 524/445 |
| 2012/0059078 | A1 * | 3/2012 | Kim et al. | 521/189 |

* cited by examiner

*Primary Examiner* — Tae H Yoon
(74) *Attorney, Agent, or Firm* — The Webb Law Firm

(57) ABSTRACT

Provided is a poly(alkylene carbonate) resin composition having superior low-temperature resistance, including: a) a poly(alkylene carbonate) resin prepared by copolymerization of carbon dioxide and at least one epoxide compound selected from the group consisting of (C2-C20)alkyleneoxide substituted or unsubstituted with halogen, (C1-C20)alkyloxy, (C6-C20)aryloxy, or (C6-C20)ar(C1-C20)alkyloxy; (C4-C20)cycloalkyleneoxide substituted or unsubstituted with halogen, (C1-C20)alkyloxy, (C6-C20)aryloxy or (C6-C20)ar(C1-C20)alkyoxy; and (C8-C20)styreneoxide substituted or unsubstituted with halogen, (C1-C20)alkyloxy, (C6-C20)aryloxy, (C6-C20)ar(C1-C20)alkyloxy, or (C1-C20)alkyl; and b) any one or two or more partially aromatic polyesters selected from polyester based on aliphatic and aromatic dicarboxylic acid and an aliphatic dihydroxy compound, and aliphatic polyesters prepared from aliphatic dicarboxylic acid and aliphatic diol.

7 Claims, No Drawings

US 9,296,892 B2

ALIPHATIC POLYCARBONATE/POLYESTER POLYMER RESIN COMPOSITION HAVING SUPERIOR LOW-TEMPERATURE RESISTANCE

CROSS-REFERENCE TO RELATED APPLICATIONS

This application claims priority under 35 U.S.C. §119 to Korean Patent Application No. 10-2012-0005031, filed on Jan. 17, 2012, in the Korean Intellectual Property Office, the disclosure of which is incorporated herein by reference in its entirety.

TECHNICAL FIELD

The following disclosure relates to an aliphatic polycarbonate resin composition, and more particularly, to an aliphatic polycarbonate/polyester resin composition including an aliphatic polycarbonate resin and a partially aromatic polyester to have superior low-temperature resistance, tensile property, and barrier property.

BACKGROUND

Since products throughout the conventional industry releases harmful gases or are manufactured using petroleum as a raw material, cost continuously increases due to exhaustion of petroleum resources, large amounts of energy are consumed in manufacturing processes, and large amounts of greenhouse gases such as carbon dioxide, and the like, are released, which majorly contributes environmental pollution. In addition, at the time of burying these products, it takes a long time to biodegrade them, and at the time of burning them, harmful materials such as environmental hormone, poisonous gas, and the like, are released to cause serious environmental pollution, such that conversion to eco-friendly products has been required in the long term.

U.S. Patent Laid-Open Publication No. 20030013840 (Patent Document 1) discloses a polyalkylene carbonate copolymer capable of being hydrolyzed or biodegraded by microorganisms in order to protect the natural environment, and a method of preparing the same. The polyalkylene carbonate copolymer has a low thermal decomposition temperature, and excellent biodegradable properties; however, flexibility thereof is significantly deteriorated to thereby have a limitation in an applicable range thereof.

In order to solve the problems, polyalkylene carbonate and a copolymer thereof have been variously developed as a polymer using carbon dioxide as a raw material, and have various uses due to excellent, strength, transparency, barrier property, and clean burning property. However, since they also have low low-temperature resistance, tensile strength, and elongation, and rigid (brittle) property to thereby be limited to being used application fields including a packing film field requiring flexibility, there is a need for solving the above-described problems.

RELATED ART DOCUMENT

Patent Document (Patent Document 1) US Patent Laid-Open Publication No. 20030013840 (Jan. 16, 2003)

SUMMARY

An embodiment of the present invention is directed to an aliphatic polycarbonate/polyester resin composition capable of being used in various industrial field by including a poly(alkylene carbonate) resin and a partially aromatic polyester resin to increase elongation and tensile strength, improve flexibility, and in particular, significantly improve low-temperature resistance.

In one general aspect, a poly(alkylene carbonate) resin composition having superior low-temperature resistance, includes: a) a poly(alkylene carbonate) resin prepared by copolymerization of carbon dioxide and at least one epoxide compound selected from the group consisting of (C2-C20) alkyleneoxide substituted or unsubstituted with halogen, (C1-C20)alkyloxy, (C6-C20)aryloxy, or (C6-C20)ar(C1-C20)alkyloxy; (C4-C20)cycloalkyleneoxide substituted or unsubstituted with halogen, (C1-C20)alkyloxy, (C6-C20) aryloxy or (C6-C20)ar(C1-C20)alkyoxy; and (C8-C20)styreneoxide substituted or unsubstituted with halogen, (C1-C20) alkyloxy, (C6-C20)aryloxy, (C6-C20)ar(C1-C20)alkyloxy, or (C1-C20)alkyl; and b) any one or two or more partially aromatic polyesters selected from polyester based on aliphatic and aromatic dicarboxylic acid and an aliphatic dihydroxy compound, and aliphatic polyesters prepared from aliphatic dicarboxylic acid and aliphatic diol.

Here, in order to improve the low-temperature resistance, a content of (a) poly(alkylene carbonate) resin may be 60 to 95 weight % and a content of (b) partially aromatic polyester may be 5 to 40 weight %, based on the total weight of (a) and (b).

In the case where the content of a) is less than 60 weight %, strength of a film is deteriorated, and in the case where the content thereof is more than 95 weight %, the low-temperature resistance is not improved. In the case where the content of b) is less than 5 weight %, tensile property is not exhibited, and in the case where the content thereof is more than 40 weight %, barrier property resulted from the aliphatic polycarbonate is not exhibited.

The poly(alkylene carbonate) resin may have excellent tensile strength, tear strength, the elongation, and flexibility due to structural specialty, excellent compatibility with processing additives.

In the present invention, the poly(alkylene carbonate) resin disclosed in patent applications previously filed by the SK Innovation Company, (Korean Patent Laid-Open Publication Nos. 2009-0090154, 2010-0067593, and 2010-0013255) was used.

The polyalkylene carbonate is prepared by copolymerization of carbon dioxide and at least one epoxide compound selected from the group consisting of (C2-C20)alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alky(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl) oxy, or (C1-C20)alkyl.

Here, the epoxide compounds may be one or more selected from the group consisting of ethylene oxide, propylene oxide, butene oxide, pentene oxide, hexene oxide, octane oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexaciecyl ether, glycidyl normal octadecyl ether, glycidyl normal isocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ethyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

Also, the poly(alkylene carbonate) may be represented by Chemical Formula 1 below:

[Chemical Formula 1]

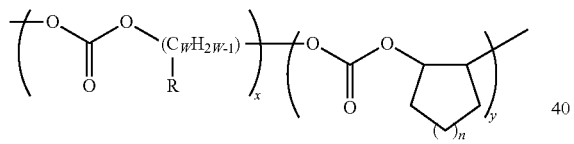

(In Chemical Formula 1, w is an integer of 2 to 10; x is an integer of 5 to 100; y is an integer of 0 to 100; n is an integer of 1 to 3; and R is hydrogen, (C1-C4)alkyl, or —CH$_2$—O—R' (R' is (C1-C8)alkyl)).

Here, in the poly(alkylene carbonate), examples of alkylene may include ethylene oxide, propylene, 1-butylene, cyclohexene oxide, alkylglycidyl ether, n-butyl, n-octyl, and the like, but are not limited thereto.

The poly(alkylene carbonate) is prepared by alternating copolymerization of carbon dioxide and at least one epoxide compound selected from the group consisting of (C2-C20) alkyleneoxide substituted or unsubstituted with halogen, (C1-C20)alkyloxy, (C6-C20)aryloxy, or (C6-C20)ar(C1-C20)alkyloxy; (C4-C20)cycloalkyleneoxide substituted or unsubstituted with halogen, (C1-C20)alkyloxy, (C6-C20) aryloxy or (C6-C20)ar(C1-C20)alkyloxy; and (C8-C20)styreneoxide substituted or unsubstituted with halogen, (C1-C20)alkyloxy, (C6-C20)aryloxy, (C6-C20)ar(C1-C20) alkyloxy, or (C1-C20)alkyl, using a complex compound of Chemical Formula 2 below as a catalyst, in the presence of a polymer compound having a hydroxyl or carboxyl group at a terminal or a side chain thereof.

[Chemical Formula 2]

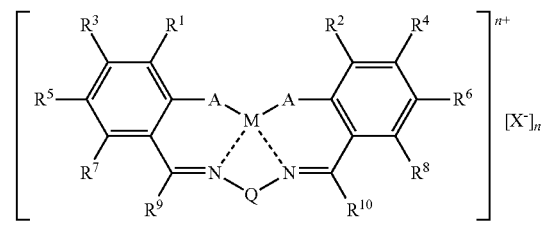

In Chemical Formula 2,
M is trivalent cobalt or trivalent chromium;
A is an oxygen or sulfur atom;
Q is a diradical linking two nitrogen atoms;
$R^1$ to $R^{10}$ each independently are hydrogen; halogen; (C1-C20)alkyl; (C1-C20)alkyl containing at least one of halogen, nitrogen, oxygen, silicon, sulfur, and phosphor; (C2-C20) alkenyl; (C2-C20)alkenyl containing at least one of halogen, nitrogen, oxygen, silicon, sulfur, and phosphor; (C1-C20) alkyl(C6-C20)aryl; (C1-C20)alkyl(C6-C20)aryl containing at least one of halogen, nitrogen, oxygen, silicon, sulfur, and phosphor; (C6-C20)aryl(C1-C20)alkyl; (C6-C20)aryl(C1-C20)alkyl containing at least one of halogen, nitrogen, oxygen, silicon, sulfur, and phosphor; (C1-C20)alkoxy; (C6-C30)aryloxy; formyl; (C1-C20)alkylcarbonyl; (C6-C20) arylcarbonyl; or a metalloid radical of Group 14 metal substituted with hydrocarbyl;
two of $R^1$ to $R^{10}$ may be linked to each other to form a ring;
at least one of hydrogens that are included in $R^1$ to $R^{10}$, and Q substituted with a protonated terminal selected from the group consisting of Chemical Formulas a, b, and c below;

[Chemical Formula a]

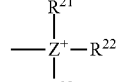

[Chemical Formula b]

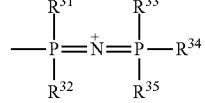

[Chemical Formula c]

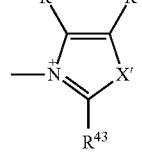

$X^-$ each independently is a halide anion; $HCO_3^-$; $BF_4^-$; $ClO_4^-$; $NO_3^-$; $PF_6^-$; (C6-C20)aryloxy anion; (C6-C20)aryloxy anion containing one or more of halogen atom, nitrogen atom, oxygen atom, silicon atom, sulfur atom, and phosphor atom; (C1-C20)alkylcarboxyl anion; (C1-C20)alkyl carboxyl anion containing one or more of halogen atom, nitrogen atom, oxygen atom, silicon atom, sulfur atom, and phosphor atom; (C6-C20)arylcarboxyl anion; (C6-C20)arylcarboxyl anion containing one or more of halogen atom, nitrogen atom, oxygen atom, silicon atom, sulfur atom, and phosphor atom; (C1-C20)alkoxy anion; (C1-C20)alkoxy anion containing one or more of halogen atom, nitrogen atom, oxygen atom, silicon atom, sulfur atom, and phosphor atom; (C1-C20)alkylcarbonate anion; (C1-C20)alkylcarbonate anion containing one or more of halogen atom, nitrogen atom, oxygen atom, silicon atom, sulfur atom, and phosphor atom; (C6-C20)arylcarbonate anion; (C6-C20)arylcarbonate anion containing one or more of halogen atom, nitrogen atom, oxygen atom, silicon atom, sulfur atom, and phosphor atom; (C1-C20)alkylsulfonate anion; (C1-C20)alkylsulfonate anion containing one or more of halogen atom, nitrogen atom, oxygen atom, silicon atom, sulfur atom, and phosphor atom; (C1-C20)alkylamido anion; (C1-C20)alkylamido anion containing one or more of halogen atom, nitrogen atom, oxygen atom, silicon atom, sulfur atom, and phosphor atom; (C6-C20)arylamido anion; (C6-C20)arylamido anion containing one or more of halogen atom, nitrogen atom, oxygen atom, silicon atom, sulfur atom, and phosphor atom; (C1-C20)alkylcarbamate anion; (C1-C20)alkylcarbamate anion containing one or more of halogen atom, nitrogen atom, oxygen atom, silicon atom, sulfur atom, and phosphor atom; or (C6-C20) arylcarbamate anion; (C6-C20)arylcarbamate anion containing one or more of halogen atom, nitrogen atom, oxygen atom, silicon atom, sulfur atom, and phosphor atom;

Z is a nitrogen or phosphor atom;

$R^{21}$, $R^{22}$, $R^{23}$, $R^{31}$, $R^{32}$, $R^{33}$, $R^{34}$, and $R^{35}$ each independently are (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20)alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of $R^{21}$, $R^{22}$, and $R^{23}$, or two of $R^{31}$, $R^{32}$, $R^{33}$, $R^{34}$, and $R^{35}$ may be linked to each other to form a ring;

$R^{41}$, $R^{42}$ and $R^{43}$ each independently are hydrogen, (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20)alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of $R^{41}$, $R^{42}$ and $R^{43}$ may be linked to each other to form a ring;

X' is an oxygen atom, a sulfur atom, or N—R (here, R is (C1-C20)alkyl);

n is an integer obtained by adding 1 to the total number of protonated terminals contained in $R^1$ to $R^{10}$ and Q;

$X^-$ may be coordinated to M; and a nitrogen atom of imine may be decoordinated from M.

In the present invention, the poly(alkylene carbonate) resin may be preferably poly(propylene carbonate) prepared by copolymerization of polypropylene oxide and carbon dioxide.

The poly(alkylene carbonate) resin of the present invention may have a weight average molecular weight of 50,000 to 1,000,000, and more preferably, 100,000 to 200,000. Here, the poly(alkylene carbonate) resin may have a glass transition temperature (Tg) of 10 to 40° C., and a melt index (MI, 150° C./5 kg) of 0.1 to 20.

The poly(alkylene carbonate) resin has a weight average molecular weight in the above range, such that the low-temperature resistance and the barrier property may be significantly improved. In the case where the weight average molecular weight is less than 50,000, it may be difficult to process the resin due to low viscosity thereof at the time of a melt extrusion process of the resin, and in the case where the weight average molecular weight is more than 1,000,000, since pressure is significantly increased at the time of the melt extrusion process of the resin, productivity may be deteriorated, As the partially aromatic polyester of the present invention, polyester based on an aliphatic and aromatic dicarboxylic acid compound and an aliphatic dihydroxy compound, and aliphatic polyester formed from aliphatic dicarboxylic acid and aliphatic diol may be preferably used, and a mixture of two or more thereof may also be used. In addition, a polyester derivative such as polyether ester, polyester amide, or polyether ester amide, linear non-chain extended polyester, chain extended and/or branched partially aromatic polyester may also be used.

The partially aromatic polyester polymer may be one or more selected from a group consisting of copolyester represented by Chemical Formula 3 below, and more particularly, poly(butylene adipate-co-terephthalate)(PBAT), or polybutylene succinate-co-terephthalate(PEST) may be preferable.

[Chemical Formula 3]

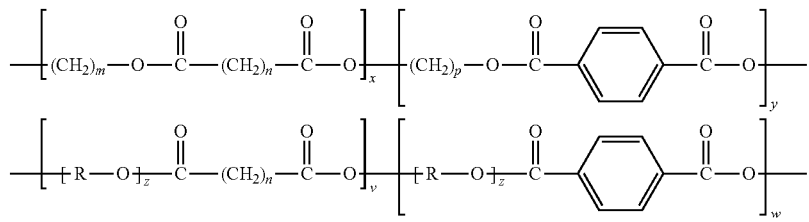

(In Chemical Formula 3, m and p each independently are an integer of 2 to 10; n is an integer of 1 to 18; —[R—O]$_z$— is one polyol selected from a group consisting of (a) polyester polyol triol having a molecular weight of 200 to 10,000, (h) polyether glycol having a molecular weight of 200 to 10,000, and (c) polyester polyol diol having a molecular weight of 200 to 10,000; x, y, V, and w each independently are an integer of 0 to 100, and all of x, y, v, and w are not 0).

The aliphatic polycarbonate/polyester resin composition according to the present invention may further include any one or two or more additives selected from a group consisting of an inorganic filler, a softener, an antioxidant, an age resister, a stabilizer, a tackifier resin, a modified resin, a leveling agent, an anti-blocking agent, a curing accelerator, an ionic liquid, a defoamer, a plasticizer, a dye, a pigment, a coloring agent, a sunblock, a fluorescent whitening agent, a dispersant, a thermal stabilizer, a photo stabilizer, an UV-absorber, an alkali metal salt, a lubricant, and a solvent, but the present invention is not limited thereto.

In another general aspect, the aliphatic polycarbonate/polyester resin composition according to the present invention is used to provide a molded article, a film, or fiber satisfying the following Equations 1 to 3, but the present invention is not limited thereto.

$$500 \leq E_{TD} \leq 800 \quad \text{[Equation 1]}$$

$$50 \leq E_{MD} \leq 400 \quad \text{[Equation 2]}$$

$$-30 \leq T_C \leq -10 \quad \text{[Equation 3]}$$

(In Equation 1, $E_{TD}$ represents an elongation value (%) in a vertical direction, in Equation 2, $E_{MD}$ represents an elongation value (%) in a horizontal direction, and in Equation 3, $T_C$ represents a low-temperature resistant temperature (° C.)).

DETAILED DESCRIPTION OF EMBODIMENTS

Hereinafter, the present invention will be described in detail with reference to the examples.

The following examples are for merely exemplifying the present invention, but the scope of the present invention is not limited to the following examples.

(Evaluation on Physical Properties)

1. Tensile Strength/Elongation

Measurement was conducted according to ASTM D638.

2. Tear Strength

Measurement was conducted according to ASTM D1004.

3. Low-Temperature Resistance

Five sheet samples (30×70 mm) were kept within a chamber at 0, −5, −10, −15, −20, −25, −30, and −35° C. for 1 hour, evaluation was then conducted on the sheet samples by the Folding test, that is, after each sample installed at the mouth thereof was folded and then unfolded, a degree at which the sample was split or broken was confirmed, and the lowermost temperature at which the sheet sample is not evaluated as a fall was measured as a low-temperature resistant temperature. The case where two or more sheet samples are broken is evaluated as Fail.

4. Haze

Each multilayer film having a width of 7 cm and a length of 7 cm was prepared as a sample. Then, the haze thereof was measured two times or more by using Haze Meter 300A, Nippon Denshoku and an average value thereof was calculated.

5. $O_2$ Permeability

Oxygen permeability was measured by using a MOCON OX-TRAN (Model 2161) equipment.

6. $H_2O$ Permeability

Water vapor permeabililty was measured by using a MOCON PERMATRAN-W (Model 3133) equipment.

Example 1

60 weight % of poly(propylene carbonate) resin (SK Innovation, GreenPol™) and 40 weight % of partially aromatic polyester (poly(butylene adipate-co-terephthalate) were blended by a twin extruder to be pelletized. At the time of blending, each temperature of the twin extruder was set to be 120/160/165/175/175° C. The pellet prepared by blending the poly(propylene carbonate) and the partially aromatic polyester was inputted into the extruder to be melted, and then a film was produced using a blown molding machine. Here, at the time of melt-extrusion, the temperatures of the extruder were set at 120/150/165/175/180° C. The produced film had a thickness of 50 μm. Physical property measurement results of the produced film were tabulated in Table 1 below.

Example 2

A film was produced by the same method as in Example 1 except that 70 weight of poly(propylene carbonate) resin (SK Innovation, GreenPol™) and 30 weight % of partially aromatic polyester(poly(butylene adipate-co-terephthalate) were used.

Comparative Example 1

A film was produced by the same method as in Example 1 except that partially aromatic polyester was not used, but only poly(propylene carbonate) resin (SK Innovation, GreenPol™) was used.

Five samples for each of the Examples were taken from the films produced according to each of the above-described Examples and physical property measurement results thereof were tabulated in Table 1 below.

TABLE 1

|  | Example 1 | Example 2 | Comparative Example 1 |
|---|---|---|---|
| Tensile Strength in vertical directioin (kg/cm$^2$) | 145 | 125 | 400 |
| Tensile Strength in horizontal directioin (kg/cm$^2$) | 130 | 117 | 380 |
| Elongation in vertical directioin (%) | 516 | 531 | 51 |
| Elongation in horizontal direction (%) | 273 | 96 | 50 |
| Tear Strength in vertical direction (g/um) | 0.81 | 0.66 | 0.1 |
| Tear Strength in horizontal direction (g/um) | 0.74 | 0.67 | 0.1 |
| Haze | 82 | 77 | 2 |
| $O_2$ permeability (cc/m$^2$ day) | 65 | 60 | 30 |
| $H_2O$ permeability (cc/m$^2$ day) | 148 | 177 | 100 |
| Low-temperature resistant temperature | −30° C. | −25° C. | 0° C. |

As shown in Table 1 above, it may be appreciated that the aliphatic polycarbonate/polyester polymer resin composition according to the present invention includes the poly(alkylene carbonate) resin and the partially aromatic polyester to have excellent tensile strength, elongation, tear strength properties, high barrier property, and in particular, superior low-temperature resistance where the low-temperature resistant temperature is around −30° C.

As set forth above, the aliphatic polycarbonate/polyester polymer resin composition according to the present invention may be eco-friendly; have excellent, gas barrier property; increase the elongation and the tensile property of the tensile strength to thereby exhibit superior physical properties and excellent flexibility; and in particular, significantly improve the low-temperature resistance.

What is claimed is:

1. A film including a poly(alkylene carbonate) resin composition having superior low-temperature resistance consisting essentially of:
   a) a poly(alkylene carbonate) resin of 60 to 95 weight % prepared by copolymerization of carbon dioxide and at least one epoxide compound selected from the group consisting of (C2-C20)alkyleneoxide unsubstituted or substituted with halogen, (C1-C20)alkyloxy, (C6-C20)aryloxy, or (C6-C20)ar(C1-C20)alkyloxy; (C4-C20)cycloalkyleneoxide unsubstituted or substituted with halogen, (C1-C20)alkyloxy, (C6-C20)aryloxy or (C6-C20)ar(C1-C20)alkyloxy; and (C8-C20)styreneoxide unsubstituted or substituted with halogen, (C1-C20)alkyloxy, (C6-C20)aryloxy, (C6-C20)ar(C1-C20)alkyloxy, or (C1-C20)alkyl; and
   b) any one or two or more partially aromatic polyesters of 5 to 40 weight % selected from poly(butylene adipate-co-terephthalate) (PBAT) and poly(butylene succinate-co-terephthalate) (PBST), and
   satisfying the following equations 1 to 3:

$500 \leq E_{TD} \leq 800$ at a film thickness of 50 μm  [Equation 1]

$50 \leq E_{MD} \leq 400$ at a film thickness of 50 μm  [Equation 2]

$-30 \leq T_C \leq -10$ at a film thickness of 50 μm  [Equation 3]

wherein in Equation 1, $E_{TD}$ represents an elongation value (%) in a vertical direction; in Equation 2, $E_{MD}$ represents an elongation value (%) in a horizontal direction; and in Equation 3, $T_C$ represents a low-temperature resistant temperature (° C.).

2. The film including a poly(alkylene carbonate) resin composition of claim 1, wherein the poly(alkylene carbonate) resin is represented by Chemical Formula 1 below:

[Chemical Formula 1]

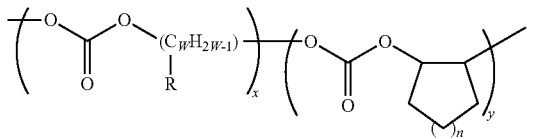

wherein in Chemical Formula 1, w is an integer of 2 to 10, x is an integer of 5 to 100, y is an integer of 1 to 100, n is an integer of 1 to 3, and R is hydrogen, (C1-C4)alkyl, or —CH$_2$—O—R' (R' is (C1-C8)alkyl).

3. The film including a poly(alkylene carbonate) resin composition of claim 1, wherein the poly(alkylene carbonate) resin has a weight average molecular weight of 50,000 to 1,000,000.

4. The film including a poly(alkylene carbonate) resin composition of claim 1, wherein the poly(alkylene carbonate) resin has a glass transition temperature (Tg) of 10 to 40° C., and a Melt Index (MI) (150°) C/5 kg) of 0.1 to 20.

5. The film including a poly(alkylene carbonate) resin composition of claim 1, wherein the poly(alkylene carbonate) resin is polypropylene carbonate) prepared by copolymerization of polypropylene oxide and carbon dioxide.

6. The film including a poly(alkylene carbonate) resin composition of claim 1, further comprising: any one or two or more additives selected from a group consisting of an inorganic filler, a softener, an antioxidant, an age resister, a stabilizer, a tackifier resin, a leveling agent, an anti-blocking agent, a curing accelerator, an ionic liquid, a defoamer, a coloring agent, a sunblock agent, a fluorescent whitening agent, a dispersant, an UV-absorber, an alkali metal salt, and a lubricant.

7. The film including a poly(alkylene carbonate) resin composition of claim 1, satisfying the following equations 4 and 5:

$60 \leq$ oxygen $\leq 65$ at a film thickness of 50 μm  [Equation 4]

$148 \leq H_2O \leq 177$ at a film thickness of 50 μm  [Equation 5]

wherein in Equation 4, oxygen is an O$_2$ permeability (cc/(m$^2$·day)); and in Equation 5, H$_2$O is an H$_2$O permeability (cc/(m$^2$·day)).

* * * * *